(12) United States Patent
Fang (10) Patent No.: US 11,638,193 B2
(45) Date of Patent: Apr. 25, 2023

(54) LOAD BALANCING METHOD AND DEVICE, STORAGE MEDIUM, AND ELECTRONIC DEVICE

(71) Applicant: ZTE Corporation, Shenzhen (CN)

(72) Inventor: Jianmin Fang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 17/266,198

(22) PCT Filed: Aug. 8, 2019

(86) PCT No.: PCT/CN2019/099826
§ 371 (c)(1),
(2) Date: Feb. 5, 2021

(87) PCT Pub. No.: WO2020/030055
PCT Pub. Date: Feb. 13, 2020

(65) Prior Publication Data
US 2021/0314837 A1    Oct. 7, 2021

(30) Foreign Application Priority Data
Aug. 8, 2018  (CN) .......................... 201810898477.4

(51) Int. Cl.
*H04W 36/22* (2009.01)
*H04W 28/08* (2023.01)
*H04W 36/00* (2009.01)

(52) U.S. Cl.
CPC ....... *H04W 36/22* (2013.01); *H04W 28/0808* (2020.05); *H04W 36/0072* (2013.01)

(58) Field of Classification Search
CPC .... H04L 47/125; H04W 16/08; H04W 16/14; H04W 28/08; H04W 28/0804;
(Continued)

(56) References Cited

U.S. PATENT DOCUMENTS

2008/0020770 A1*  1/2008  Hofmann ............... H04W 36/22
                                                         455/438
2010/0027507 A1*  2/2010  Li ......................... H04W 36/0058
                                                         370/331
(Continued)

FOREIGN PATENT DOCUMENTS

CN      104486799 A     4/2015
CN      105188091 A    12/2015
(Continued)

OTHER PUBLICATIONS

International Search Report for corresponding application PCT/CN2019/099826 filed on Aug. 8, 2019; dated Oct. 28, 2019.
(Continued)

*Primary Examiner* — Kan Yuen
(74) *Attorney, Agent, or Firm* — Cantor Colburn LLP (57) ABSTRACT

A load balancing method and device, a storage medium and an electronic device are provided. The method includes the following operations. A first node receives cell available resource information of a target cell of a second node from the second node, wherein the cell available resource information includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell. The first node performs load balancing according to the cell available resource information of the target cell of the second node.

12 Claims, 4 Drawing Sheets

---

A first node receives cell available resource information of a target cell of a second node from the second node, wherein the cell available resource information includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell — S302

The first node performs load balancing according to the cell available resource information of the target cell of the second node — S304

(58) Field of Classification Search
CPC ......... H04W 28/0808; H04W 28/0812; H04W 36/0072; H04W 36/20; H04W 36/22
See application file for complete search history.

(56) References Cited

U.S. PATENT DOCUMENTS

| | | | | |
|---|---|---|---|---|
| 2010/0189070 | A1* | 7/2010 | Shi | H04W 48/20 370/331 |
| 2011/0244866 | A1* | 10/2011 | Yamamoto | H04W 36/22 455/438 |
| 2013/0040683 | A1* | 2/2013 | Siomina | H04W 28/0236 455/517 |
| 2013/0217407 | A1 | 8/2013 | Gerlach | |
| 2014/0086139 | A1* | 3/2014 | Kang | H04L 25/20 370/315 |
| 2014/0349704 | A1* | 11/2014 | Xiao | H04W 16/08 455/525 |
| 2015/0264601 | A1* | 9/2015 | Cha | H04W 36/0055 455/436 |
| 2016/0006659 | A1 | 1/2016 | Kim | |
| 2016/0057708 | A1* | 2/2016 | Siomina | H04W 72/1263 455/452.2 |
| 2016/0198377 | A1* | 7/2016 | Centonza | H04W 36/14 370/331 |
| 2016/0302119 | A1* | 10/2016 | Chen | H04W 36/03 |
| 2016/0323805 | A1* | 11/2016 | Ryu | H04W 76/15 |
| 2018/0115927 | A1* | 4/2018 | Vesterinen | H04W 36/0072 |
| 2018/0279186 | A1* | 9/2018 | Park | H04W 36/0077 |
| 2019/0116537 | A1* | 4/2019 | Lee | H04W 36/0058 |
| 2019/0297517 | A1* | 9/2019 | Hyun | H04W 24/10 |

FOREIGN PATENT DOCUMENTS

| | | |
|---|---|---|
| CN | 107820717 A | 3/2018 |
| WO | 2012044372 A1 | 4/2012 |

OTHER PUBLICATIONS

European Search Report for corresponding application EP19847976; Report dated Sep. 29, 2021.

* cited by examiner

LOAD BALANCING METHOD AND DEVICE, STORAGE MEDIUM, AND ELECTRONIC DEVICE

The present disclosure claims priority to Chinese Patent Application No. 201810898477.4, filed with the China National Intellectual Property Administration (CNIPA) on 8 Aug. 2018, the disclosure of which is incorporated herein by reference in its entirety.

TECHNICAL FIELD

The present disclosure relates to the field of communications, and in particular, to a load balancing method and device, a storage medium, and an electronic device.

BACKGROUND

Figure 1:
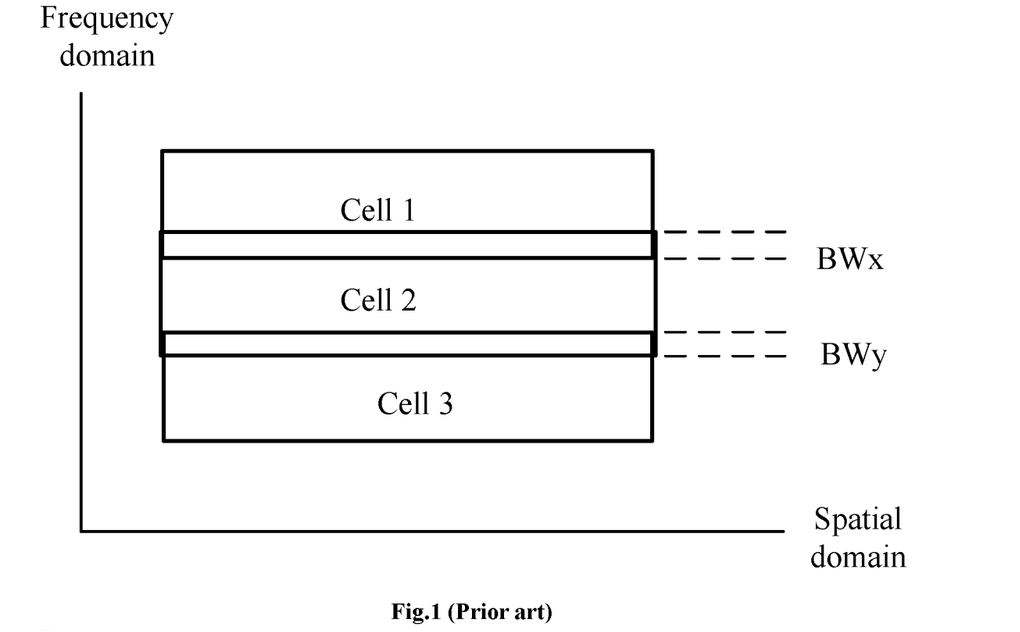
FIG. 1 is a schematic diagram illustrating a space domain and a frequency domain of a cell in a 5G mobile communication system.
Figure 2:
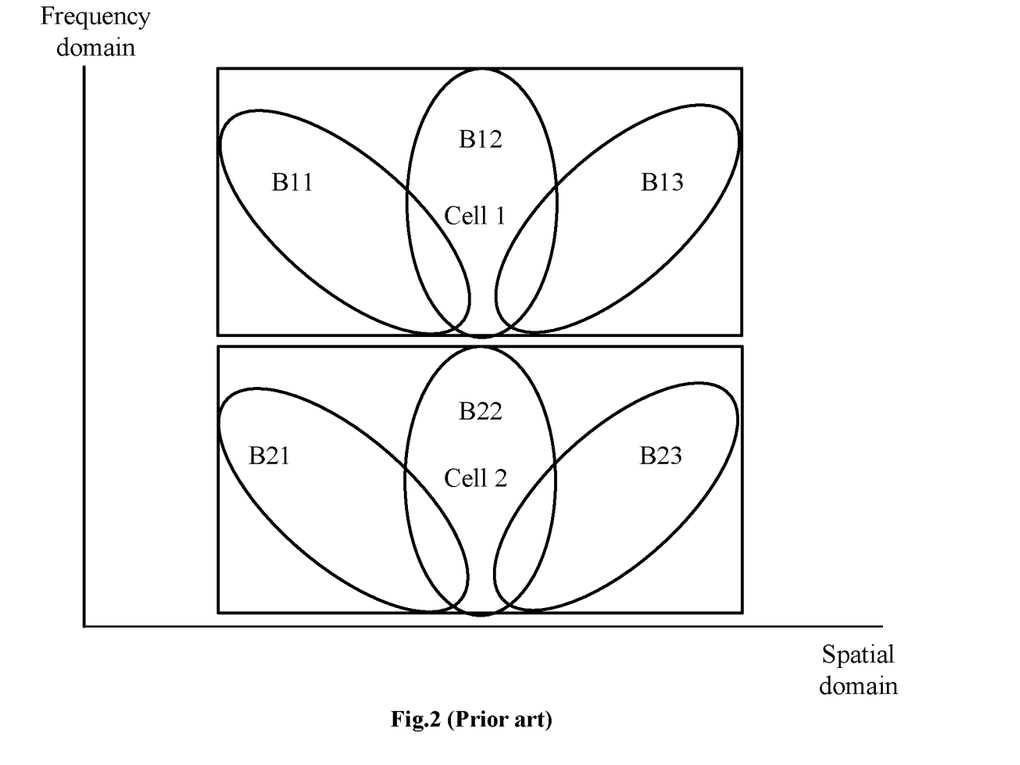
FIG. 2 is a schematic diagram illustrating the existence of multiple beams in one cell.

In a new generation wireless communication system, for example, a 5th Generation (5G) system, cells with the same coverage (namely, the same coverage in a space domain) may have an overlapping part in a frequency domain. As shown in FIG. 1, a bandwidth BWx is an overlapping part between a cell 1 and a cell 2, and a bandwidth BWy is an overlapping part between the cell 2 and a cell 3. In addition, one cell may be composed of multiple beams. As shown in FIG. 2, the cell 1 is composed of beams B11, B12 and B13, and the cell 2 is composed of beams B21, B22 and B23.

When the load balancing operation is performed, since the cells with the same coverage have an overlapping part in the frequency domain, or multiple beams exist in one cell, the load balancing mechanism has a problem of low accuracy.

SUMMARY

Embodiments of the present disclosure provide a load balancing method and device, a storage medium, and an electronic device, which may at least solve a problem of low accuracy of a load balancing mechanism in the related art.

An embodiment of the present disclosure provides a load balancing method which includes the following operations. A first node receives cell available resource information of a target cell of a second node sent by the second node, wherein the cell available resource information includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell. The first node performs load balancing according to the cell available resource information of the target cell of the second node.

Another embodiment of the present disclosure provides a load balancing device, which is applied to a first node and includes a first receiving module and a processing module. The first receiving module is configured to receive cell available resource information of a target cell of a second node sent by the second node, wherein the cell available resource information includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell. The processing module is configured to perform load balancing according to the cell available resource information of the target cell of the second node.

Still another embodiment of the present disclosure provides a storage medium, in which a computer program is stored. The computer program is configured to execute the operations in the method embodiment.

Still another embodiment of the present disclosure provides an electronic device including a memory and a processor. The memory stores a computer program. The processor is configured to run the computer program to execute the operations in any of the method embodiments.

By means of the embodiments of the present disclosure, when a first node performs load balancing, situations in the second node, for example, cells with the same coverage have an overlapping part in the frequency domain and one cell is composed of multiple beams, are fully considered, thereby improving the accuracy of load balancing.

DETAILED DESCRIPTION OF THE EMULSIONS

The present disclosure will be described below with reference to the drawings and embodiments in detail.

It is to be noted that the terms "first", "second" and the like in the specification, the claims and the drawings of the present disclosure are used to distinguish similar objects, and are not used to describe a specific sequence or a precedence order.

Embodiment 1

Figure 3:
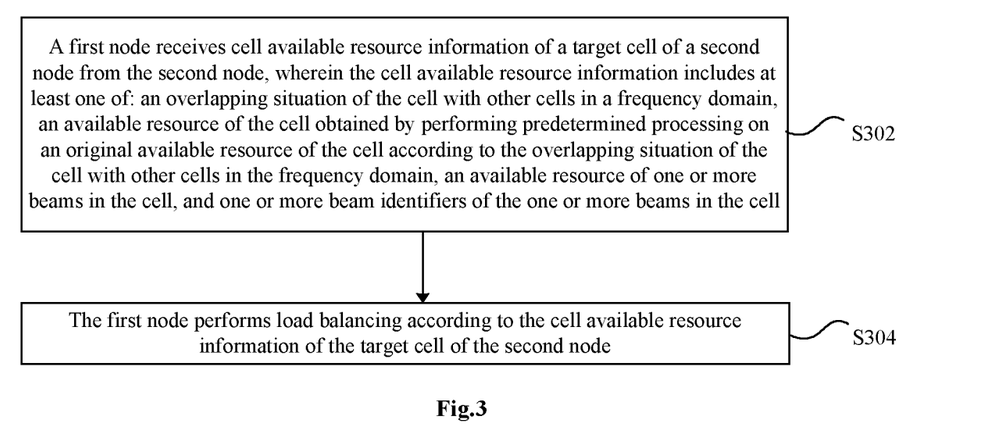
FIG. 3 is a schematic flowchart of a load balancing method according to an embodiment of the present disclosure.

The embodiment provides a load balancing method. FIG. 3 is a flowchart of a load balancing method according to an embodiment of the present disclosure. As shown in FIG. 3, the flow includes operations S302 and S304, which are described below in detail.

At S302, a first node receives cell available resource information of a target cell of a second node from the second node, wherein the cell available resource information includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell.

At S304, the first node performs load balancing according to the cell available resource information of the target cell of the second node.

It should be noted that the first node and the second node may be, but are not limited to, a base station.

In some exemplary implementations, the execution order of the operation S302 and the operation S304 may be interchanged. That is, the operation S304 may be executed first, and then the operation S302 is executed.

Through the operations S302 to S304, when the first node performs load balancing (namely, judging whether to hand all or part of the terminals in the source cell with a larger load over to the target cell), the first node sufficiently considers the situations in the second node, for example, cells with the same coverage have an overlapping part in the frequency domain and one cell is composed of multiple beams, thereby improving the accuracy of load balancing. By virtue of the scheme of the embodiments of the present disclosure, a problem of low accuracy of a load balancing mechanism when implementing the load balancing operation, caused by the situations that the cells with the same coverage have an overlapping part in the frequency domain and one cell is composed of multiple beams, can be solved.

In some exemplary implementations, the operation that the first node performs the load balancing according to the cell available resource information of the target cell of the second node may include operations S11 and S12, which are described below in detail.

At S11, the first node sends a handover request message with respect to the selected UE to the second node.

In some exemplary implementations, the handover request message carries at least one of the following information: a cell identifier of a source cell of the first node, cell available resource information of the source cell of the first node, a cell identifier of the target cell of the second node, and the cell identifier of the target cell of the second node as well as a beam identifier of a target beam in the target cell of the second node. The cell available resource information of the source cell of the first node includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell.

At S12, the first node performs load balancing according to a handover response message sent by the second node. Herein, the handover response message may include a handover preparation failure message and a handover preparation success message.

By means of the operations S11 to S12, the first node sends the cell available resource information of the first node to the second node, so that the second node makes a handover response according to the cell available resource information sent by the first node.

In some exemplary implementations, the operation that the first node performs the load balancing according to the handover response message sent by the second node may include operations S21 and S22, which are described below in detail.

At S21, if the handover response message is the handover preparation failure message with respect to the selected UE, the first node cancels a load balancing operation from the source cell of the first node to the target cell of the second node with respect to the selected UE.

At S22, if the handover response message is the handover preparation success message with respect to the selected UE, the first node performs a load balancing operation from the source cell of the first node to the target cell of the second node with respect to the selected UE.

By means of the operations S21 to S22, the handover operation is executed under the premise that handover response message with respect to the selected UE is the handover preparation success message, instead of executing the load balancing operation of the selected UE from the source cell of the first node to the target cell of the second node regardless of whether the handover can be performed. In this way, resource waste can be avoided.

In some exemplary implementations, before the first node performs the load balancing according to the handover response message sent by the second node, the method may further include operations S31 and S32, which are described below in detail.

At S31, the second node compares the cell available resource information of the target cell of the second node with the cell available resource information of the source cell of the first node.

At S32, the second node sends the handover response message to the first node according to a comparison result.

In some exemplary implementations, before the first node receives the cell available resource information of the target cell of the second node from the second node, the method may further include operations S41 and S4, which are described below in detail.

At S41, the first node sends an available resource request message to the second node. Herein, the available resource request message is used to request the second node to provide the cell available resource information of the target cell of the second node.

At S42, the first node receives an available resource request response message or an available resource request failure message sent by the second node.

By means of the operations S41 to S42, the cell available resource information can be exchanged between the first node and the second node, thereby further solving the problem of low accuracy of a load balancing mechanism when implementing the load balancing operation, caused by the situations that the cells with the same coverage have an overlapping part in the frequency domain and one cell is composed of multiple beams, and achieving the technical effect of improving the accuracy of load balancing.

In some exemplary implementations, the available resource request message, the available resource request response message and the available resource request failure message include messages of at least one of the following interfaces: an Evolved Universal Terrestrial Radio Access- New Radio Access Dual-Connection (EN-DC) X2 interface, an Xn interface, an F1 interface and an E1 interface.

It should be noted that the EN-DC X2 interface is established between a 5G base station and a 4th Generation (4G) base station to support a dual connection operation. In this case, the 4G base station is a Master Node (MN), and the 5G base station is a Secondary Node (SN).

In a 5G mobile communication system, a 5G base station is referred to as a New Generation Radio Access Network Node (NG RAN Node, gNB), an interface between gNBs is referred to as an Xn interface, and an interface between the gNB and a Core Network (CN) is referred to as an NG interface.

The 5G base station can be split into two parts: a Central Unit (CU) and a Distributed Unit (DU). One base station has one CU and may have multiple DUs, and this split is referred to as a CU DU Split. An interface between the CU and the DU is referred to as an F1 interface.

The CU of a 5G base station may be split into two parts: a Control Plane (CP) and a User Plane (UP), and this split is referred to as CP UP Split. An interface between the CP and the UP is referred to as an E1 interface.

The embodiment will be described below in detail with reference to exemplary embodiments and examples.

Exemplary Embodiment 1

Figure 4:
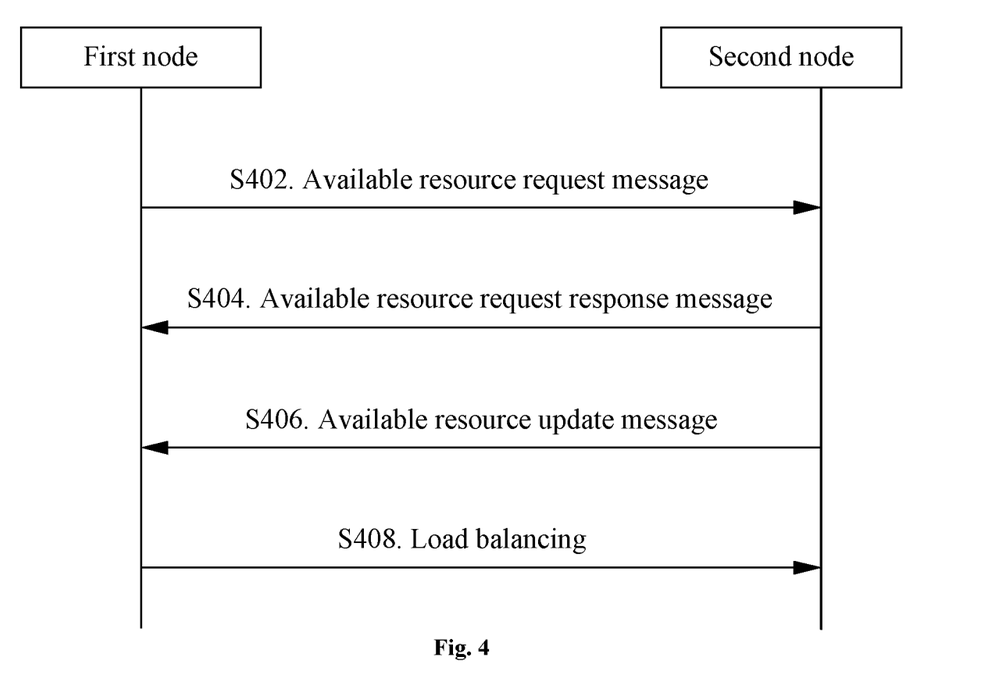
FIG. 4 is a schematic flowchart of message interaction in a load balancing process according to an embodiment of the present disclosure.

The exemplary embodiment provides a load balancing method. As shown in FIG. 4, the method mainly includes operations S402 and S408, which are described below in detail.

At S402, a first node sends an available resource request message to a second node. The available resource request message carries one or more cell identifiers of one or more cells, for which the cell available resource detail information needs to be reported, in the second node, and configuration request information of the cell available resource detail information. The configuration request information of the cell available resource detail information includes at least one of: requesting to provide an overlapping situation of the cell with other cells in a frequency domain; requesting to provide cell available resource information obtained after considering the overlapping situation of the cell in the frequency domain; requesting to provide available resource information of one or more beams in the cell and one or more beam identifiers of the one or more beams in the cell.

At S404, when the second node can completely or partially fulfill the request in the available resource request message, the second node returns an available resource request response message. When the second node cannot fulfill any request in the available resource request message, the second node returns an available resource request failure message. The available resource request response message and the available resource request failure message carry cell identifiers of cells, which cannot fulfill all of the request items in the available resource request message, in the second node, request items that cannot be fulfilled by these cells, and reasons for the incapability of fulfilling these request items.

The available resource request message may be a message of an EN-DC X2 interface, an Xn interface, an F1 interface, or an E1 interface, for example, a RESOURCE STATUS REQUEST message.

The available resource request response message may be a message of an EN-DC X2 interface, an Xn interface, an F1 interface, or an E1 interface, for example, a RESOURCE STATUS RESPONSE message.

The available resource request failure message may be a message of an EN-DC X2 interface, an Xn interface, an F1 interface, or an E1 interface, for example, a RESOURCE STATUS FAILURE message.

At S406, the second node periodically sends an available resource update message to the first node. The available resource update message carries a cell identifier of a cell, which can report cell available resource detail information, in the second node, and cell available resource detail information. The cell available resource detail information includes at least one of: an overlapping situation of the cell with other cells in the frequency domain; an available resource of the cell after the overlapping situation of the cell in the frequency domain is considered; an available resource of one or more beams in the cell; and one or more beam identifiers of the one or more beams in the cell.

An overlapping situation of the cell with other cells in the frequency domain includes: a frequency point (a lowest frequency point or a central frequency point) and bandwidth information of each overlapping cell; or the bandwidth of each overlapping section and the number of overlapping cells.

The available resource of the cell obtained after considering the overlapping situation of the cells in the frequency domain is an available resource of the cell obtained by discounting the original available resource of the cell according to the overlapping situation of the cell.

At S408, the first node performs a load balancing operation according to the cell available resource detail information of the related cell in the second node in the received available resource update message.

For example, when receiving an overlapping situation of the cell with other cells in the frequency domain, the available resource of the cell in the second node is calculated according to the overlapping situation of the cell in the frequency domain and other cells, and the available resource of the cell in the first node is compared with the available resource of the cell in the second node, so as to decide whether to perform a load balancing operation from the cell in the first node to the cell in the second node.

For example, when receiving the available resource of the cell obtained by considering the overlapping situation of the cell in the frequency domain, available resource of the cell in the first node is compared with the available resource of the cell in the second node, so as to decide whether to perform the load balancing operation from the cell in the first node to the cell in the second node.

For example, when receiving the available resource of one or more beams in the cell and the one or more beam identifiers of the one or more beams in the cell, the available resource of the one or more beams in the cell in the first node is compared with the received available resource of one or more beams in the cell in the second node, so as to decide whether to perform a load balancing operation from the cell in the first node to the cell in the second node.

The available resource update message may be a message of an EN-DC X2 interface, an Xn interface, an F1 interface, or an E1 interface, for example, a RESOURCE STATUS UPDATE message.

Example 1

At S51, a first node sends an available resource request message to a second node. The available resource request message carries one or more cell identifiers of one or more cells, for which the cell available resource detail information needs to be reported, in the second node, and configuration request information of the cell available resource detail information. The configuration request information of the cell available resource detail information includes: requesting to provide an overlapping situation of the cell with other cells in a frequency domain; requesting to provide information of the available resource of the cell obtained after considering the overlapping situation of the cell in the frequency domain.

At S52, the second node can partially fulfill the request in the available resource request message, and the second node returns an available resource request response message. The available resource request response message carries cell identifiers of cells, which cannot fulfill all of the request items in the available resource request message, in the second node, request items that cannot be fulfilled by these cells, and reasons for the incapability of fulfilling these request items.

At S53, the second node periodically sends an available resource update message to the first node. The available resource update message carries a cell identifier of a cell, which can report cell available resource detail information, in the second node, and cell available resource detail information. The cell available resource detail information includes: an overlapping situation of the cell with other cells in a frequency domain; the available resource of the cell obtained by considering the overlapping situation of the cell in the frequency domain.

An overlapping situation of the cell with other cells in the frequency domain includes: a frequency point (a lowest frequency point or a central frequency point) and bandwidth information of each overlapping cell. For example, in FIG. 1, a Cell 2 overlaps with a Cell 1 and a Cell 3, and an overlapping situation of the Cell 2 with other cells in the frequency domain includes frequency point and bandwidth information of the Cell 1, and frequency point and bandwidth information of the Cell 3. In this way, based on the overlapping situation of the Cell 2 and the frequency point and bandwidth information of the Cell 2, all the details about the details of overlapping of the Cell 2 with other cells in the frequency domain can be learnt. Alternatively, the overlapping situation of the Cell 2 with other cells in the frequency domain may include the bandwidth of each overlapping section and the number of overlapping cells. For example, in FIG. 1, a Cell 2 overlaps with a Cell 1 and a Cell 3, and an overlapping situation of the Cell 2 with other cells in the frequency domain includes a bandwidth (BWx) of an overlapping portion of the Cell 2 and the Cell 1 and the number (which is equal to 2 in the present example) of overlapping cells, and a bandwidth (BWy) of an overlapping portion of the Cell 2 and the Cell 3 and the number (which is equal to 2 in the present example) of overlapping cells. In this way, part of details of overlapping and sharing of the Cell 2 with other cells in the frequency domain can be learnt by combining bandwidth information of the Cell 2.

The available resource of the cell obtained after considering the overlapping situation of the cells in the frequency domain is the available resource of the cell obtained by discounting the original available resource of the cell according to the overlapping situation of the cell. For example, in FIG. 1, Cell2 overlaps with Cell1 and Cell3. The bandwidth of the Cell2 is BW2=100, the bandwidth of the overlapping part of the Cell2 and the Cell1 is BWx=20, and the number of overlapped cells is Nx=2. The bandwidth of the overlapping part of the Cell2 and the Cell3 is BWy=20, and the number of overlapped cells is Ny=2. The available resource of the Cell2 is estimated as: the original available resource of the Cell2*((BW2−BWx−BWy+BWx/Nx+BWy/Ny)/BW2)=the original available resource of the Cell2* ((100−20−20+20/2+20/2)/100)=the original available resource of the Cell2*(0.8). For another example, different discounts are applied to different numbers of the overlapping cells during estimation. For example, the discount can be 0.6 (different from ½) when the number of the overlapping cells is 2, and can be 0.38 (different from ⅓) when the number of the overlapping cells is 3. For another example, different discount processing may be performed on the overlapping part of different frequencies and the different numbers of the overlapping cells in two dimensions during estimation.

At S54, the first node performs a load balancing operation according to the cell available resource detail information of the related cell in the second node in the received available resource update message.

When receiving the overlapping situation of the cell with other cells in the frequency domain, the available resource of the cell in the second node can be calculated according to the overlapping situation of the cell with the other cells in the frequency domain, and the available resource of the cell in the first node is compared with the available resource of the cell in the second node, so as to decide whether to perform a load balancing operation from the cell in the first node to the cell in the second node.

When receiving the available resource of the cell obtained by considering the overlapping situation of the cell in the frequency domain, the available resource of the cell in the first node is compared with the received available resource of the cell in the second node, so as to decide whether to perform a load balancing operation from the cell in the first node to the cell in the second node.

Example 2

At S61, a first node sends an available resource request message to a second node. The available resource request message carries one or more cell identifiers of one or more cells, for which the cell available resource detail information needs to be reported, in the second node, and configuration request information of the cell available resource detail information. The configuration request information of the cell available resource detail information includes information of an available resource of one or more beams in the cell and one or more beam identifiers of the one or more beams in the cell.

At S62, when the second node can completely or partially fulfill the request in the available resource request message, the second node returns an available resource request response message. When the second node cannot fulfill any request in the available resource request message, the second node returns an available resource request failure message. The available resource request response message and the available resource request failure message carry cell identifiers of cells, which cannot fulfill all of the request items in the available resource request message, in the second node, request items that cannot be fulfilled by these cells, and reasons for the incapability of fulfilling these request items.

At S63, the second node sends an available resource update message to the first node periodically. The available resource update message carries a cell identifier of a cell, which can report cell available resource detail information, in the second node, and cell available resource detail information. The cell available resource detail information includes an available resource of one or more beams in the cell and one or more beam identifiers of the one or more beams in the cell.

At S64, the first node compares the available resource of the one or more beams in the cell in the second node with the available resource of one or more relevant beams in a relevant cell in the first node according to the cell available resource detail information of the relevant cell in the second node in the received available resource update message, so as to decide whether to perform a load balancing operation on the relevant cell in the first node to the cell in the second node.

Exemplary Embodiment 2

Figure 5:
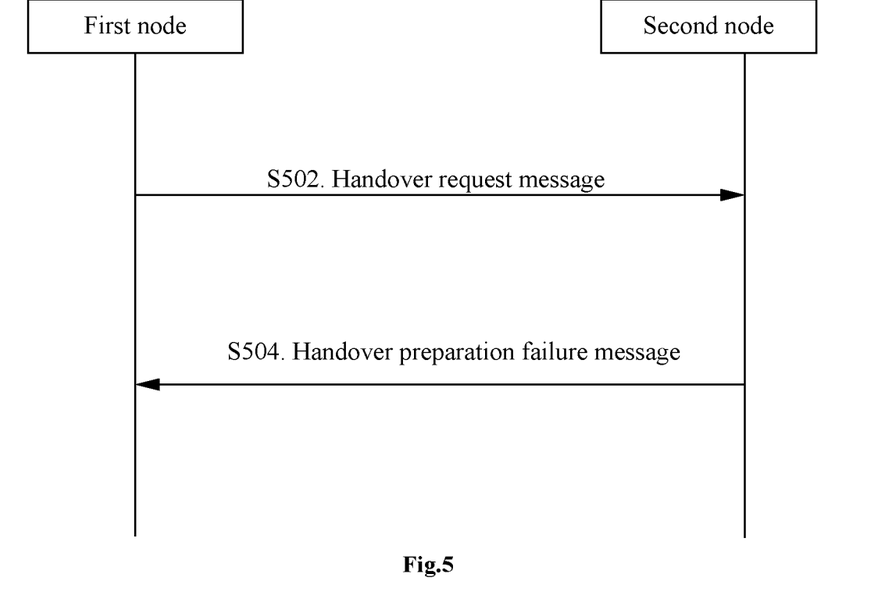
FIG. 5 is a schematic flowchart of message interaction before load balancing according to another embodiment of the present disclosure.

In this embodiment, a load balancing method is also provided. As shown in FIG. 5, the load balancing method mainly includes the following operations S502.

At S502, a first node sends a handover request message to a second node. The handover request message carries a cell identifier of a source cell in the first node, cell available resource detail information of the source cell, and a cell identifier of a target cell in the second node, or a cell identifier of a target cell in the second node as well as a beam identifier of a target beam. The cell available resource detail information includes at least one of: an overlapping situation of the cell with other cells in a frequency domain; the available resource of the cell obtained by considering the overlapping situation of the cell in the frequency domain; and an available resource of one or more beams in the cell and one or more beam identifiers of the one or more beams in the cell.

At S04, the second node compares the cell available resource detail information of the target cell in the second node with the cell available resource detail information of the source cell in the first node. When the target cell has lower available resource than the source cell, or when the target beam has lower available resource than the source beam in the source cell, the second node returns a handover preparation failure message (HANDOVER PREPARATION FAILURE), carrying at least one of: a failure reason which is a high load at the target cell or a high load of the beams in a target cell; and details of the available resource of the target cell.

By means of the method provided in the present embodiment, a load balancing operation can be accurately implemented with respect to new situations occurring in a 5G system.

Through the description of the above implementations, those having ordinary skill in the art can understand that the method according to the above embodiment may be implemented by means of software plus a necessary general hardware platform, and of course, may also be implemented through hardware, but in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/ Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

Embodiment 2

The embodiment provides a load balancing device. The apparatus is used to implement the above embodiments and exemplary implementations, and the details having been described will not be repeated. As used below, the term "module" may implement a combination of software and/or hardware of a predetermined function. Although the apparatus described in the following embodiments is preferably implemented in software, the implementation in hardware or a combination of software and hardware is also possible and contemplated.

Figure 6:
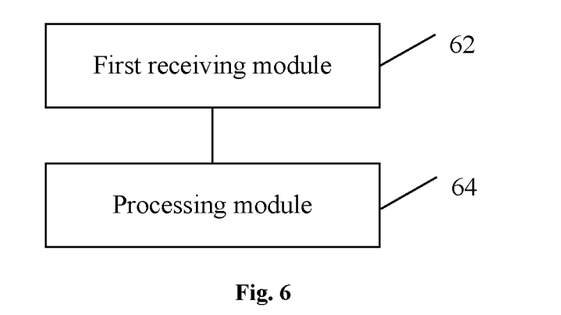
FIG. 6 is a block diagram illustrating the schematic structure of a load balancing device according to an embodiment of the present disclosure.

FIG. 6 is a block diagram illustrating the schematic structure of a load balancing device according to an embodiment of the present disclosure. As shown in FIG. 6, the device includes the following modules. 1) A first receiving module 62 is configured to receive cell available resource information of a target cell of a second node sent by the second node, wherein the cell available resource information includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell. 2) A processing module 64 is configured to perform load balancing according to the cell available resource information of the target cell of the second node.

Through the device shown in FIG. 6, when the first node performs load balancing (namely, judging whether to hand all or part of the terminals in the source cell with a larger load over to the target cell), the first node sufficiently considers the situations in the second node, for example, cells with the same coverage have an overlapping part in the frequency domain and one cell is composed of multiple beams, thereby improving the accuracy of load balancing. By virtue of the scheme of the embodiments of the present disclosure, a problem of low accuracy of a load balancing mechanism when implementing the load balancing operation, caused by the situations that the cells with the same coverage have an overlapping part in the frequency domain and one cell is composed of multiple beams, can be solved.

Figure 7:
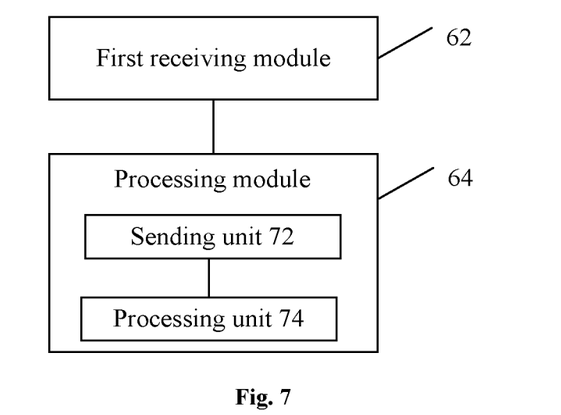
FIG. 7 is a block diagram illustrating the schematic structure of a load balancing device according to another embodiment of the present disclosure.

FIG. 7 is a block diagram illustrating the schematic structure of a load balancing device according to another embodiment of the present disclosure. As shown in FIG. 7, the processing module 64 includes the following units. 1) A sending unit 72 is configured to send a handover request message with respect to the selected UE to the second node, wherein the handover request message carries at least one of the following information: a cell identifier of a source cell of the first node, cell available resource information of a source cell of the first node, a cell identifier of the target cell of the second node, or the cell identifier of the target cell of the second node as well as a beam identifier of a target beam in the target cell of the second node; and the cell available resource information of the source cell of the first node includes at least one of: an overlapping situation of the cell with other cells in a frequency domain, an available resource of the cell with other cells in the frequency domain, an available resource of the cell obtained by performing predetermined processing on an original available resource of the cell according to the overlapping situation of the cell with other cells in the frequency domain, an available resource of one or more beams in the cell and one or more beam identifiers of the one or more beams in the cell. 2) A processing unit 74 is configured to perform load balancing according to a handover response message sent by the second node, wherein the handover response message includes a handover preparation failure message and a handover preparation success message.

Figure 8:
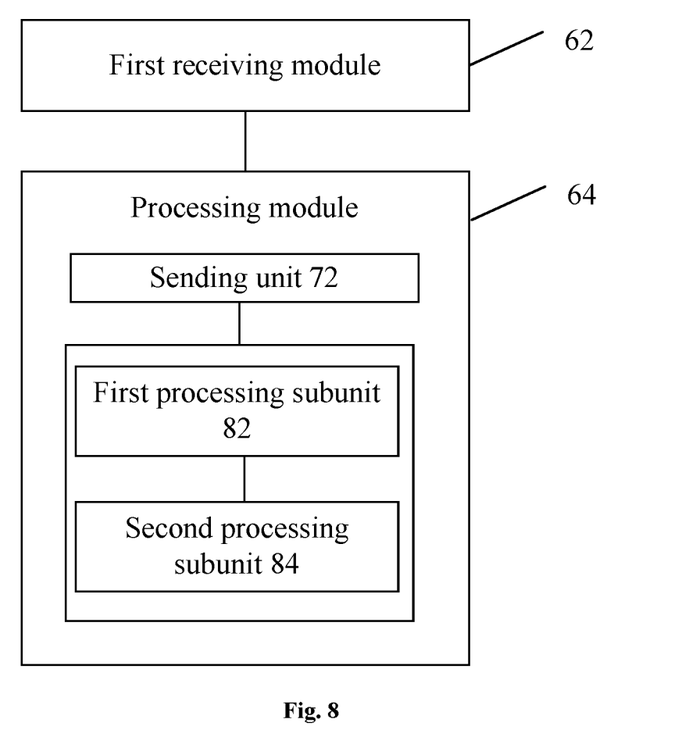
FIG. 8 is a block diagram illustrating the schematic structure of a load balancing device according to another embodiment of the present disclosure.

By means of the device shown in FIG. 8, a first node sends cell available resource information of the first node to a second node, so that the second node makes a handover response according to the cell available resource information sent by the first node.

FIG. 8 is a block diagram illustrating the schematic structure of a load balancing device according to another embodiment of the present disclosure. As shown in FIG. 8, a processing unit 74 includes the following subunits. 1) A first processing subunit 82 is configured to cancel a load balancing operation from the source cell of the first node to the target cell of the second node with respect to the selected UE when a handover response message with respect to the selected UE is the handover preparation failure message. 2) A second processing subunit 84 is configured to perform a load balancing operation from the source cell of the first node to the target cell of the second node with respect to the selected UE when the handover response message with respect to the selected UE is the handover preparation success message.

By means of the device as shown in FIG. 8, the handover operation is executed under the premise that handover response message with respect to the selected UE is the handover preparation success message, instead of executing the load balancing operation of the selected UE from the source cell of the first node to the target cell of the second node regardless of whether the handover can be performed. In this way, resource waste can be avoided.

Figure 9:
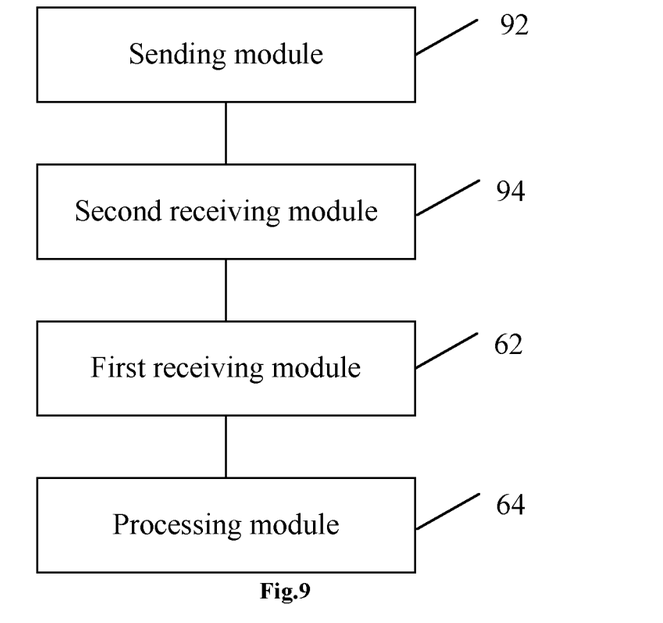
FIG. 9 is a block diagram illustrating the schematic structure of a load balancing device according to another embodiment of the present disclosure.

FIG. 9 is a block diagram illustrating the schematic structure of a load balancing device according to another embodiment of the present disclosure. As shown in FIG. 9, the device may further include the following modules. 1) A sending module 92 is configured to send an available resource request message to the second node before the first node receives the cell available resource information of the target cell of the second node from the second node, wherein the available resource request message is used to request the second node to provide the cell available resource information of the target cell of the second node. 2) A second receiving module 94 is configured to receive an available resource request response message or an available resource request failure message sent by the second node.

By means of the device as shown in FIG. 9, the cell available resource information can be exchanged between the first node and the second node, thereby further solving the problem of low accuracy of a load balancing mechanism in a 5G system, and achieving the technical effect of improving the accuracy of load balancing.

It is to be noted that each of the above modules may be implemented by software or hardware. For the latter, the modules may be implemented by, but not limited to, either of the following manners: the above modules are all located in the same processor; or, the above modules are located in different processors in any combination form respectively.

Embodiment 3

Embodiments of the present disclosure also provide a storage medium. The storage medium stores a computer program, and the computer program is configured to execute the operations in any one of the method embodiments at runtime.

In some exemplary implementations, the storage medium may be set to store a computer program for executing the following operations. At S1, a first node receives cell available resource information of a target cell of a second node from the second node. The cell available resource information includes at least one of: an overlapping situation of the cell with other cells in a frequency domain, an available resource of the cell obtained by performing pre-determined processing on an original available resource of the cell according to the overlapping situation of the cell with other cells in the frequency domain, an available resource of one or more beams in the cell, and one or more beam identifiers of the one or more beams in the cell. At S2, the first node performs load balancing according to the cell available resource information of the target cell of the second node.

In some exemplary implementations, the storage medium is further arranged to store a computer program for performing the following operations. At S1, the first node sends a handover request message with respect to the selected UE to the second node. Herein, the handover request message carries at least one of the following information: a cell identifier of a source cell of the first node, cell available resource information of the source cell of the first node, a cell identifier of the target cell of the second node, or the cell identifier of the target cell of the second node as well as a beam identifier of a target beam in the target cell of the second node. The cell available resource information of the source cell of the first node includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell. At S2, the first node performs load balancing according to a handover response message sent by the second node, wherein the handover response message includes a handover preparation failure message and a handover preparation success message.

In some exemplary implementations, the storage medium may include, but is not limited to, any medium that can store a computer program, such as a USB flash drive, a Read-Only Memory (ROM), a Random Access Memory (RAM), a removable hard disk, a magnetic disk, or an optical disc.

An embodiment of the present disclosure also provides an electronic device, including a memory and a processor. The memory stores a computer program, and the processor is configured to run the computer program so as to execute the operations in any of the method embodiments.

In some exemplary implementations, the electronic device may further include a transmission device and an input/output device. The transmission device is connected to the processor, and the input/output device is connected to the processor.

In some exemplary implementations, the processor may be configured to perform the following operations based on a computer program. At S1, a first node receives cell available resource information of a target cell of a second node from the second node. Herein, the cell available resource information includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell. At S2, the first node performs load balancing according to the cell available resource information of the target cell of the second node.

In some exemplary implementations, the processor is further configured to store a computer program for executing the following operations. At S1, the first node sends a handover request message with respect to the selected UE to the second node. Herein, the handover request message carries at least one of the following information: a cell identifier of a source cell of the first node, cell available resource information of a source cell of the first node, a cell identifier of the target cell of the second node, or the cell identifier of the target cell of the second node as well as a beam identifier of a target beam in the target cell of the second node. The cell available resource information of the source cell of the first node includes at least one of: an overlapping situation of the cell with other cells in a frequency domain, an available resource of the cell obtained by performing predetermined processing on an original available resource of the cell according to the overlapping situation of the cell with other cells in the frequency domain, an available resource of one or more beams in the cell, and one or more beam identifiers of the one or more beams in the cell. At S2, the first node performs load balancing according to a handover response message sent by the second node, wherein the handover response message includes a handover preparation failure message and a handover preparation success message.

Optionally, specific implementations for the present embodiment may refer to the examples described in the above embodiments and alternative implementations, and details are not repeated in the present embodiment.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

What is claimed is:

1. A load balancing method, comprising:
receiving, by a first node, cell available resource information of a target cell of a second node from the second node, wherein the cell available resource information of the target cell comprises at least one of: an overlapping situation of the target cell with other cells in a frequency domain, an available resource of the target cell obtained by performing predetermined processing on an original available resource of the target cell according to the overlapping situation of the target cell with other cells in the frequency domain, an available resource of one or more beams in the target cell, and one or more beam identifiers of the one or more beams in the target cell; and performing, by the first node, load balancing according to the cell available resource information of the target cell of the second node;

wherein performing, by the first node, the load balancing according to the cell available resource information of the target cell of the second node comprises:

sending, by the first node, a handover request message with respect to selected User Equipment (UE) to the second node, and performing, by the first node, the load balancing according to a handover response message sent by the second node, wherein the handover response message comprises a handover preparation failure message or a handover preparation success message, the handover response message is a message reported by the second node based on a comparison result obtained after comparing the cell available resource information of the target cell of the second node with the cell available resource information of the source cell of the first node;

wherein before performing, by the first node, the load balancing according to the handover response message sent by the second node, the method further comprises: comparing, by the second node, the cell available resource information of the target cell of the second node with the cell available resource information of the source cell of the first node; and sending, by the second node, the handover response message to the first node according to a comparison result;

wherein before receiving, by the first node, the cell available resource information of the target cell of the second node from the second node, the method further comprises: sending, by the first node, an available resource request message to the second node, wherein the available resource request message is used for requesting the second node to provide the cell available resource information of the target cell of the second node; and receiving, by the first node, an available resource request response message or an available resource request failure message sent by the second node;

wherein the available resource request message carries one or more cell identifiers of one or more cells, for which the cell available resource information needs to be reported, in the second node, and configuration request information of the cell available resource information;

wherein the configuration request information of the cell available resource information comprises at least one of: requesting to provide the overlapping situation of the cell with other cells in a frequency domain; requesting to provide cell available resource information obtained after considering the overlapping situation of the cell in the frequency domain; requesting to provide available resource information of one or more beams in the cell and one or more beam identifiers of the one or more beams in the cell.

2. The method according to claim 1, wherein the handover request message carries at least one of the following information: a cell identifier of a source cell of the first node, cell available resource information of the source cell of the first node, a cell identifier of the target cell of the second node, and the cell identifier of the target cell of the second node as well as a beam identifier of a target beam in the target cell of the second node; and the cell available resource information of the source cell of the first node comprises at least one of: an overlapping situation of the source cell with other cells in a frequency domain, an available resource of the source cell obtained by performing predetermined processing on an original available resource of the source cell according to the overlapping situation of the source cell with other cells in the frequency domain, an available resource of one or more beams in the source cell, and one or more beam identifiers of the one or more beams in the source cell.

3. The method according to claim 2, wherein the performing, by the first node, the load balancing according to the handover response message sent by the second node comprises:
   in a case where the handover response message with respect to the selected UE is the handover preparation failure message, cancelling, by the first node, a load balancing operation from the source cell of the first node to the target cell of the second node with respect to the selected UE;
   in a case where the handover response message with respect to the selected UE is the handover preparation success message, performing, by the first node, a load balancing operation from the source cell of the first node to the target cell of the second node with respect to the selected UE.

4. The method according to claim 1, wherein the available resource request message, the available resource request response message and the available resource request failure message comprise messages of at least one of the following interfaces:
   an Evolved Universal Terrestrial Radio Access-new Radio Access Dual-Connection (EN-DC) X2 interface, an Xn interface, an F1 interface and an E1 interface.

5. The method according to claim 1,
   in a case where the first node receives the available resource request response message, the available resource request response message carries cell identifiers of one or more cells, which cannot fulfill all request items in the available resource request message, in the second node, request items that cannot be fulfilled by the one or more cells, and reasons for the incapability of fulfilling the request items;
   in a case where the first node receives the available resource request failure message, the available resource request failure message carries cell identifiers of one or more cells, which cannot fulfill all request items in the available resource request message, in the second node, request items that cannot be fulfilled by the one or more cells, and reasons for the incapability of fulfilling the request items.

6. The method according to claim 1, wherein the overlapping situation of the cell with other cells in the frequency domain comprises: a frequency point and bandwidth information of each overlapping cell; or a bandwidth of each overlapping section and the number of overlapping cells.

7. The method according to claim 6, wherein the frequency point comprises a lowest frequency point or a central frequency point.

8. A load balancing system, comprising a first node and a second node, wherein:
   the first node is configured to executing the following operations:
   receive cell available resource information of a target cell of a second node from the second node, wherein the cell available resource information of the target cell comprises at least one of: an overlapping situation of the target cell with other cells in a frequency domain, an available resource of the target cell obtained by performing predetermined processing on an original available resource of the target cell according to the overlapping situation of the target cell with other cells in the frequency domain, an available resource of one or more beams in the target cell, and one or more beam identifiers of the one or more beams in the target cell; and
   perform load balancing according to the cell available resource information of the target cell of the second node;
   wherein the processor, when configured to execute the instructions to perform the load balancing according to the cell available resource information of the target cell of the second node, is configured to: send a handover request message with respect to selected User Equipment (UE) to the second node; and perform the load balancing according to a handover response message sent by the second node, wherein the handover response message comprises a handover preparation failure message or a handover preparation success message; wherein the handover response message is a message reported by the second node based on a comparison result obtained after comparing the cell available resource information of the target cell of the second node with the cell available resource information of the source cell of the first node;
   the second node is configured to executing the following operations before the first node perform the load balancing according to the handover response message sent by the second node:
   compare the cell available resource information of the target cell of the second node with the cell available resource information of the source cell of the first node; and
   send the handover response message to the first node according to a comparison result;
   wherein the processor is further configured to execute the instructions to: send an available resource request message to the second node before the first node receives the cell available resource information of the target cell of the second node from the second node, wherein the available resource request message is used for requesting the second node to provide the cell available resource information of the target cell of the second node; and receive an available resource request response message or an available resource request failure message sent by the second node;
   wherein the available resource request message carries one or more cell identifiers of one or more cells, for which the cell available resource information needs to be reported, in the second node, and configuration request information of the cell available resource information;
   wherein the configuration request information of the cell available resource information comprises at least one of: requesting to provide the overlapping situation of the cell with other cells in a frequency domain; requesting to provide cell available resource information obtained after considering the overlapping situation of the cell in the frequency domain; requesting to provide available resource information of one or more beams in the cell and one or more beam identifiers of the one or more beams in the cell.

9. The device according to claim 8, wherein the handover request message carries at least one of the following information: a cell identifier of a source cell of the first node, cell available resource information of the source cell of the first node, a cell identifier of the target cell of the second node, and the cell identifier of the target cell of the second node as well as a beam identifier of a target beam in the target cell of the second node; and the cell available resource information of the source cell of the first node comprises at least one of: an overlapping situation of the source cell with other cells in a frequency domain, an available resource of the source cell obtained by performing predetermined processing on an original available resource of the source cell according to the overlapping situation of the source cell with other cells in the frequency domain, an available resource of one or more beams in the source cell, and one or more beam identifiers of the one or more beams in the source cell.

10. The device according to claim 9, wherein the processor, when configured to execute the instructions to perform the load balancing according to the handover response message sent by the second node, is configured to:
in a case where the handover response message with respect to the selected UE is the handover preparation failure message, cancel a load balancing operation from the source cell of the first node to the target cell of the second node with respect to the selected UE;
in a case where the handover response message with respect to the selected UE is the handover preparation success message, perform a load balancing operation from the source cell of the first node to the target cell of the second node with respect to the selected UE.

11. The device according to claim 8, wherein the available resource request message comprises messages of at least one of the following interfaces:
an Evolved Universal Terrestrial Radio Access-new Radio Access Dual-Connection (EN-DC) X2 interface, an Xn interface, an F1 interface and an E1 interface;
in a case where receive the available resource request response message sent by the second node, the available resource request response message comprises messages of at least one of the following interfaces:
an Evolved Universal Terrestrial Radio Access-new Radio Access Dual-Connection (EN-DC) X2 interface, an Xn interface, an F1 interface and an E1 interface;
in a case where receive the available resource request failure message sent by the second node, the available resource request response message comprises messages of at least one of the following interfaces:
an Evolved Universal Terrestrial Radio Access-new Radio Access Dual-Connection (EN-DC) X2 interface, an Xn interface, an F1 interface and an E1 interface.

12. A non-transitory computer-readable storage medium, wherein the storage medium stores a computer program, and the computer program, when being run by a processor, is configured to execute the method according to claim 1.

* * * * *